United States Patent
Namekawa

(10) Patent No.: US 8,488,054 B2
(45) Date of Patent: Jul. 16, 2013

(54) ELECTRONIC DEVICE INCLUDING A BIOMETRIC AUTHENTICATION FUNCTION

(75) Inventor: Kimiyasu Namekawa, Tokyo (JP)

(73) Assignee: Sony Corporation, Tokyo (JP)

( * ) Notice: Subject to any disclaimer, the term of this patent is extended or adjusted under 35 U.S.C. 154(b) by 169 days.

(21) Appl. No.: 12/707,351

(22) Filed: Feb. 17, 2010

(65) Prior Publication Data
US 2010/0259665 A1 Oct. 14, 2010

(30) Foreign Application Priority Data
Apr. 14, 2009 (JP) .................................. 2009-098413

(51) Int. Cl.
*H04N 5/222* (2006.01)

(52) U.S. Cl.
USPC .......................................... 348/370; 348/371

(58) Field of Classification Search
None
See application file for complete search history.

(56) References Cited

U.S. PATENT DOCUMENTS

| 6,242,769 | B1* | 6/2001 | Chang et al. .................. 257/291 |
| 7,319,489 | B2* | 1/2008 | Miki .............................. 348/371 |
| 7,405,751 | B2* | 7/2008 | Lee et al. ................... 348/220.1 |
| 2005/0088567 | A1* | 4/2005 | Kim ............................... 348/370 |
| 2008/0205711 | A1* | 8/2008 | Kishigami et al. ............ 382/115 |
| 2008/0317293 | A1* | 12/2008 | Sakurai et al. ............... 382/115 |
| 2010/0008544 | A1* | 1/2010 | Abe et al. ...................... 382/115 |
| 2010/0008545 | A1* | 1/2010 | Ueki et al. .................... 382/115 |

FOREIGN PATENT DOCUMENTS
JP 2000-147623 5/2000

* cited by examiner

*Primary Examiner* — Luong T Nguyen
(74) *Attorney, Agent, or Firm* — Oblon, Spivak, McClelland, Maier & Neustadt, L.L.P.

(57) ABSTRACT

An electronic device is provided which includes a light emitting unit for emitting light, and a light detection unit which is irradiated with the light emitted by the light emitting unit and which includes an optical sensor for outputting an electric current corresponding to the brightness of the light. The light emitted by the light emitting unit is used for a purpose other than being irradiated to the light detection unit.

9 Claims, 14 Drawing Sheets

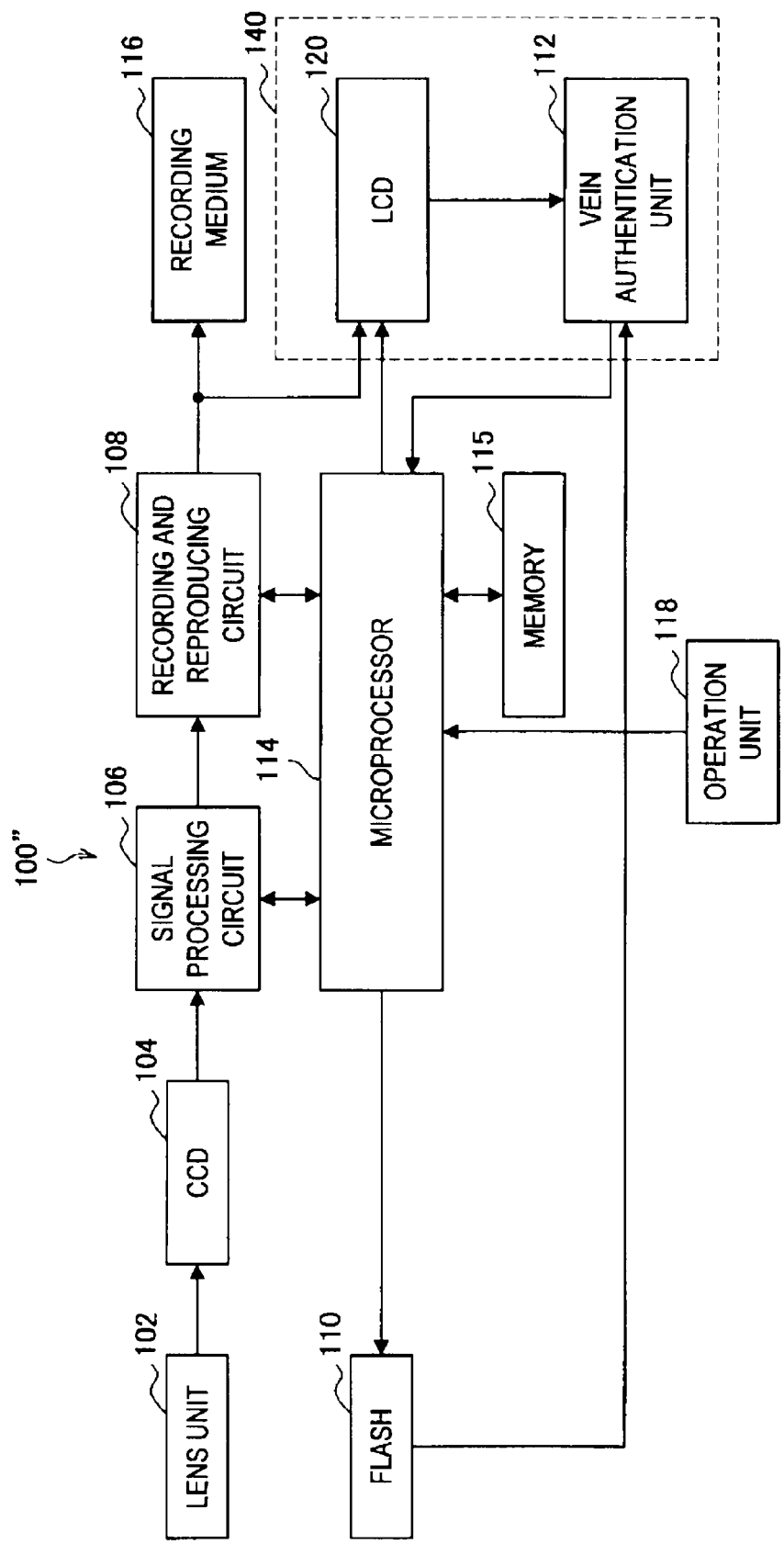

ELECTRONIC DEVICE INCLUDING A BIOMETRIC AUTHENTICATION FUNCTION

BACKGROUND OF THE INVENTION

1. Field of the Invention

The present invention relates to an electronic device.

2. Description of the Related Art

As electronic devices come to have higher performance or to have larger recording capacity in recent years, the number and the types of information that can be recorded in the electronic devices increase. For example, in a digital steel camera, the capacity of an embedded memory or a memory card increases and more photographed images can be saved. Moreover, the digital steel camera itself become multifunctional and has higher performance and there has appeared a type that also has a use as a portable album or that can access the Internet.

However, in the case where such an electronic device is lost or stolen, the amount of information that is stolen is large. When personal information or private information is recorded in the electronic device, such information has a high risk of being stolen. Accordingly, when such important information is recorded in an electronic device, there is an issue of including in the electronic device a mechanism for protecting the recorded information.

As a technology related to a mechanism for protecting the information recorded within an electronic device, there is a technology of obtaining in advance the identification information (e.g., ID information) of the person who is permitted to use the electronic device. This is a technology in which identification information is read at the time of use, and only when the read identification matches the identification information obtained in advance, the person who has the identification information is permitted to use.

Then, a means using biometric authentication is effective as this means of reading identification information. The biometric authentication includes an authentication method such as fingerprint authentication, vein authentication, voice authentication, retina authentication, face authentication and the like. It is difficult to replicate biometric information, so that high security can be ensured by the biometric authentication. Moreover, since a locking means such as a key does not have to be carried around with an electronic device and authentication is possible without using such locking means, the biometric authentication draws attention in recent years. A technology of digital steel camera using biometric authentication in Japanese Unexamined Patent Application Publication No. 2000-147623, for example.

SUMMARY OF THE INVENTION

In the case where a means of authentication by biometric authentication is used in an electronic device, such authentication means have to be embedded in the housing of the device. Accordingly, there was an issue that the size of the housing grew by the authentication means being embedded in the housing of the device. Especially in the case of the authentication means by using vein authentication, a TFT (Thin Film Transistor) is used for recognizing a finger vein pattern as described later, but the signal-to-noise ratio of the TFT is not always good. Accordingly, there is conceived a configuration in which light is irradiated from a light source in order to improve the signal-to-noise ratio of the TFT. However, there is an issue that preparation of the light source for performing vein authentication processing leads to increase in the size and cost of the device. In recent years, there has been a strong demand for making devices thinner and smaller, so that there was an issue that it was difficult to increase the size of the device even when the authentication means is included in the device.

In light of the foregoing, it is desirable to provide a novel and improved electronic device capable of suppressing the increase of the size of the housing even in the case of including an authentication means by using vein authentication which is a biometric authentication.

According to an embodiment of the present invention, there is provided an electronic device including a light emitting unit for emitting light, and a light detection unit which is irradiated with the light emitted by the light emitting unit and which includes an optical sensor for outputting an electric current corresponding to the brightness of the light. The light emitted by the light emitting unit is used for other purpose than being irradiated to the light detection unit.

According to the configuration, the light emitting unit emits light, the light detection unit includes the optical sensor, and the optical sensor is irradiated with the light emitted by the light emitting unit and outputs the electric current cording to the brightness of the light. Then, the light emitted by the light emitting unit is used for other purpose than being irradiated to the light detection unit. As a result, since a separate light source does not have to be used for irradiating light to the light detection unit, even in the case of including an authentication means by using the vein authentication which is a biometric authentication, the increase in the size of the housing can be suppressed.

The electronic device may further include a liquid crystal display device for displaying an image thereon, and a drive circuit of the liquid crystal display device and the optical sensor may be formed on the same substrate.

When the light from the light emitting unit is irradiated to the light detection unit, a light emitting surface of the light emitting unit may face the inside of a housing without being exposed to the outside of the housing.

The electronic device may further include a light collecting unit for collecting the light emitted by the light emitting unit.

The light emitting unit may be a flash for emitting light to a subject when the subject is imaged.

The electronic device may further include a liquid crystal display device for displaying an image thereon, and the light emitting unit may be a backlight of the liquid crystal display device.

The electronic device may further include a light shielding unit for blocking irradiation of the light emitted by the light emitting unit to the light detection unit, and when the light from the light emitting unit is caused to be irradiated to the light detection unit, the light shielding unit may not block the irradiation to the light detection unit.

The light emitting unit may be rotatably provided.

The electronic device may further include an external-light shielding unit for blocking irradiation of external light, other than the light from the light emitting unit, to the light detection unit.

The electronic device may further include a light absorbing film for transmitting only light in a near-infrared region among the light emitted by the light emitting unit.

According to the embodiment of the present invention described above, there can be provided a novel and improved electronic device capable of suppressing the increase of the size of the housing even in the case of including the authentication means by using the vein authentication which is a biometric authentication, by including the light emitting unit used for a purpose other than irradiating light to the light detection unit and by irradiating the light emitted by the light emitting unit to the light detection unit.

BRIEF DESCRIPTION OF THE DRAWINGS

FIG. 13 is an explanatory diagram showing a functional configuration of an image pickup device 100" according to the embodiment of the present invention;

DETAILED DESCRIPTION OF THE EMBODIMENT

Figure 1:
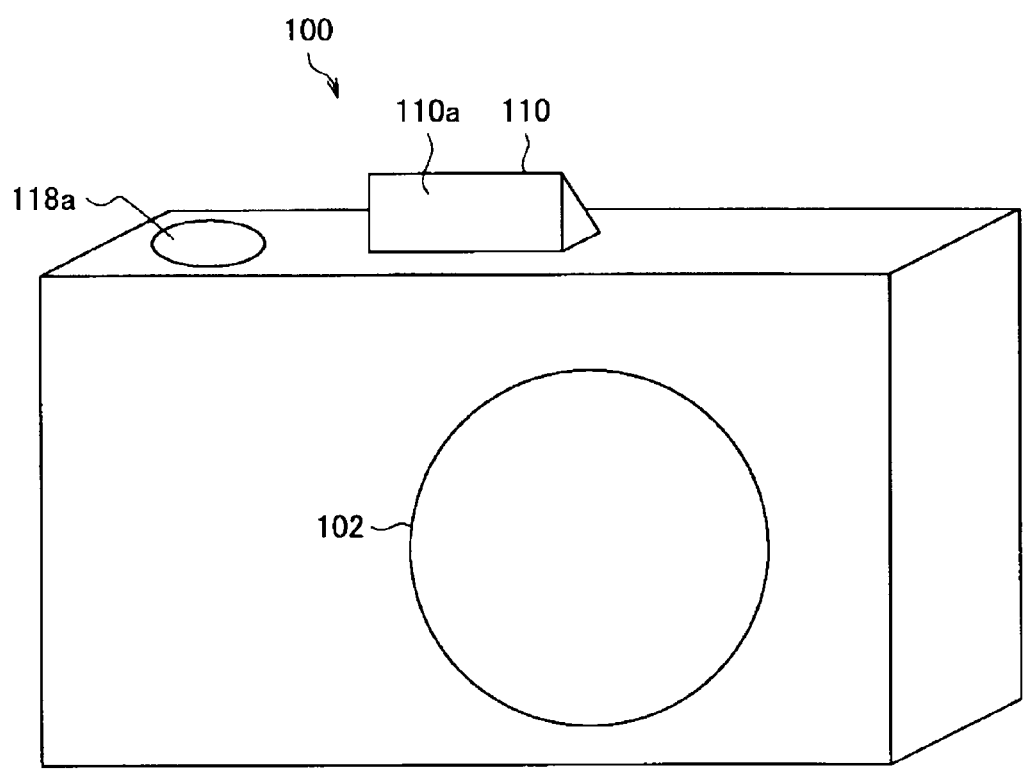
FIG. 1 is an explanatory diagram showing a front perspective view of an image pickup device 100 according to an embodiment of the present invention.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

In the following, a preferred embodiment of the present invention will be described in detail with reference to appended drawings.

<1. Embodiment of the present invention>
  [1-1. Example of the appearance of image pickup device]
  [1-2. Functional configuration of image pickup device]
  [1-3. Light collecting mechanism of flash]
  [1-4. Registration processing of vein pattern]
  [1-5. Vein authentication processing]
<2. Modification of the embodiment of the present invention>
<3. Arrangement of TFTs>
<4. Summary>
<1. Embodiment of the Present Invention>
  [1-1. Example of the Appearance of Image Pickup Device]

First, an example of the appearance of an image pickup device according to an embodiment of the present invention will be described. FIG. 1 is an explanatory diagram showing a front perspective view of the image pickup device 100 according to the embodiment of the present invention. Moreover, FIG. 2 is an explanatory diagram showing a rear perspective view of the image pickup device 100 according to the embodiment of the present invention.

Figure 2:
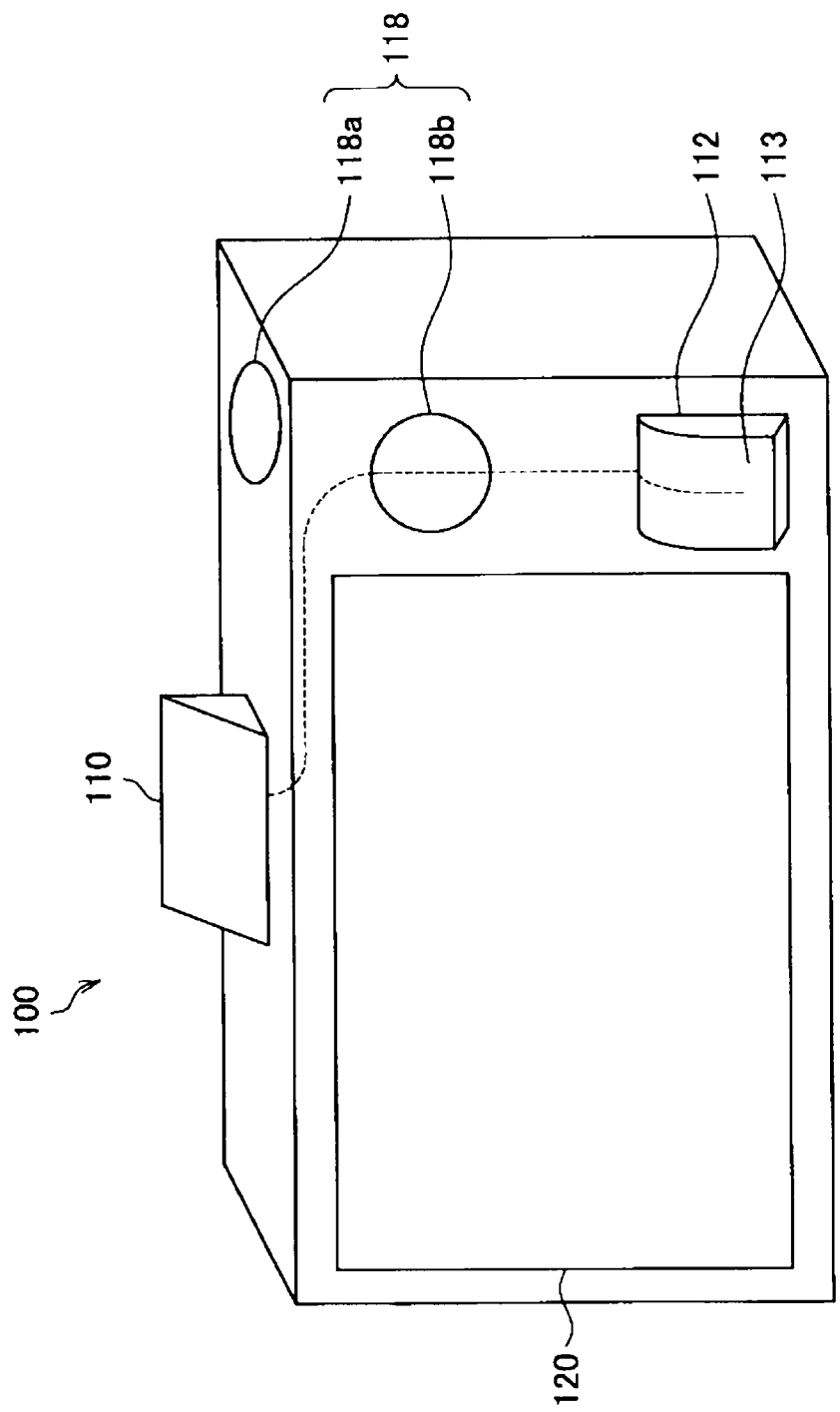
FIG. 2 is an explanatory diagram showing a rear perspective view of the image pickup device 100 according to the embodiment of the present invention.

The image pickup device 100 shown in FIG. 1 and FIG. 2 is an example of the electronic device of the present invention. As shown in FIG. 1 and FIG. 2, the image pickup device 100 according to the embodiment of the present invention includes a lens unit 102, a flash 110, a vein authentication unit 112, an operation unit 118, a LCD (Liquid Crystal Display) 120.

The lens unit 102 is designed to collect light from a subject and take the light into the image pickup device 100 when an image is photographed by using the image pickup device 100. By converting the light collected by the lens unit 102 into an electrical signal, the image pickup device 100 can photograph the image electronically. The flash 110 is designed to emit light when the image is photographed by using the image pickup device 100, and to irradiate the light to the subject. Moreover, the light emitted from the flash 110 is also used at the time of biometric authentication using vein authentication other than the time of the image photographing. The image pickup device 100 according to the embodiment of the present invention includes a structure in which the flash 100 pops out from the top of the housing as shown in FIG. 1 and FIG. 2 at the time of photographing by using the flash 110. On the other hand, the image pickup device 100 according to the embodiment of the present invention includes a structure capable of containing the flash 110 within the housing when photographing without using the flash 110.

The vein authentication unit 112 performs vein authentication processing using a finger of a human hand and the vein authentication unit 112 includes an optical sensor for detecting light and outputting an electric current corresponding to the intensity of the detected light. The vein authentication unit 112 includes a cover 113 for shielding the external light such as sunlight or light of a fluorescent. In the present embodiment, the vein authentication unit 112 performs light detection by the optical sensor including a TFT (Thin Film Transistor) (also referred to as "TFT optical sensor" hereinafter). The TFT has characteristics that when light is not cast thereon, a small amount of leakage current (light leakage current) flows in a gate-off area, and when light is cast thereon, a leakage current corresponding to the intensity (brightness) of the light flows in the gate-off area (see Japanese Unexamined Patent Application Publication No. 2007-316196).

Here, the biometric authentication using vein authentication will be described. The vein authentication utilizes the near-infrared light absorbing characteristics of hemoglobin in erythrocyte included in the blood flowing through veins in a human finger. When a finger is put on the TFT optical sensor and light is irradiated thereon from the above, the light in the near-infrared region passes through the area where there is no vein and is irradiated to the TFT optical sensor, but the light in the near-infrared region is absorbed in the area where there are veins and is not irradiated to the TFT optical sensor. Accordingly, the TFT optical sensor outputs a light leakage current in the area where there is no vein, and hardly outputs an electric current in the area where there are veins. Different humans have different vein patterns. Accordingly, the biometric authentication using vein authentication is feasible by obtaining in advance, as a finger vein pattern, the pattern of the TFT which outputted a light leakage current when light was irradiated from above a finger of the hand of a person who has a use qualification. The current value of the light leakage current differs between the area where near-infrared light is absorbed by the vein and is not irradiated thereon and the area where near-infrared light is not absorbed by the vein and is irradiated thereon. The digitized current value of the light leakage current is obtained in advance as a finger vein pattern. Then, authentication processing can be performed by determining whether the pattern of the TFT which outputted the light leakage current matches the obtained finger vein pattern.

By the way, as described above, there is the issue that although the TFT optical sensor is a sensor for detecting the irradiation of the light by the optical leakage current, the signal-to-noise ratio of the TFT optical sensor is not good. If the signal-to-noise ratio of the TFT optical sensor is not good, it may influence the accuracy of the authentication. Accordingly, in order to improve the signal-to-noise ratio of the TFT optical sensor, the image pickup device 100 according to the present embodiment includes a structure in which light is irradiated to the TFT optical sensor of the vein authentication unit 112 at the time of vein authentication processing.

Figure 3:
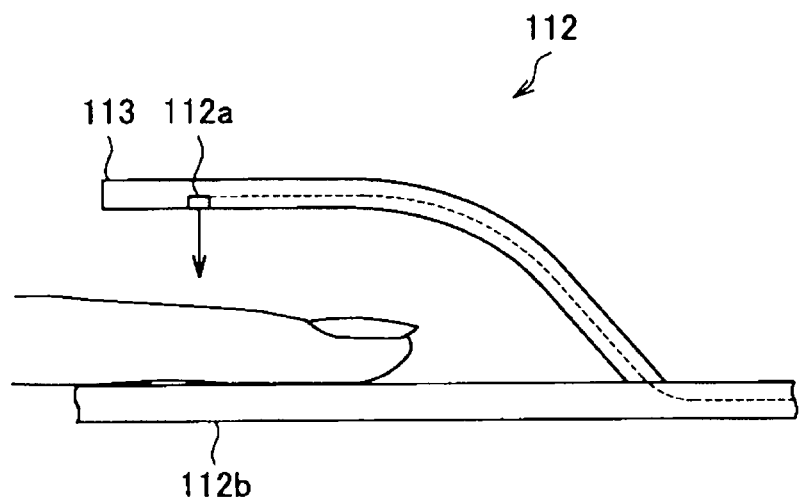
FIG. 3 is an explanatory diagram showing a cross section seen from the side of a vein authentication unit 112.

FIG. 3 is an explanatory diagram showing a cross section seen from the side of the vein authentication unit 112 shown in FIG. 2. As shown in FIG. 3, the vein authentication unit 112 includes a light source 112a, a TFT optical sensor 112b, and the cover 113. The light source 112a irradiates light having predetermined wavelength to the TFT optical sensor 112b when the vein authentication processing is performed in the vein authentication unit 112. The TFT optical sensor 112b includes a plurality of TFTs arranged in a matrix and is configured such that when the light emitted from the light source 112a is detected, a light leakage current corresponding to the intensity of the detected light flows from the TFTs. Moreover, the cover 113 is an example of an external-light shielding unit of the present invention, which plays a role of preventing the external light such as sunlight or light of a fluorescent from being irradiated to the TFT optical sensor 112b at the time of the vein authentication processing.

As described above, when the vein authentication is performed, there is obtained the current value of the light leakage current at the time when light is irradiated to the TFT optical sensor 112b from above a finger of the hand of a person who has a use qualification. The current value of the light leakage current differs between the area where near-infrared light is absorbed by the vein and is not irradiated thereon and the area where the near-infrared light is not absorbed by the vein and irradiated thereon. The digitized current value of the light leakage current is obtained in advance as a finger vein pattern. Then, authentication processing can be performed by determining whether the pattern of the TFT which outputted the light leakage current matches the obtained finger vein pattern.

The image pickup device 100 according to the present embodiment has characteristics in that the light emitted by the flash 110 is utilized, the light emitted by the flash 110 is guided to the light source 112a, and the light is irradiated from the light source 112a to the TFT optical sensor 112b. By using the light emitted from the flash 110 to irradiate the TFT optical sensor 112b, the signal-to-noise ratio of the TFT optical sensor which is by no means good can be improved.

In addition, a light absorbing film for transmitting only near-infrared light may be included between flash 110 and the finger in order to further improve the signal-to-noise ratio of the TFT optical sensor, although not shown in FIG. 3.

An operation unit 118 is designed for a photographer to perform various operations on the image pickup device 100. As shown in FIG. 1 and FIG. 2, the operation unit 118 includes a shutter button 118a and an operation button 118b. The shutter button 118a is a button which is pressed to bring a subject into focus at the time of photographing or to photograph an image. The shutter button 118a is a button which is pressed to make various settings for the image photographing.

A LCD 120 displays a photographed image, a live view of the subject whose image is captured through the lens unit 102, and also the various settings of the image pickup device 100.

The example of the appearance of the image pickup device 100 according to the embodiment of the present invention has been described above. Next, a functional configuration of the image pickup device 100 according to the embodiment of the present invention will be described.

[1-2. Functional Configuration of the Image Pickup Device]

Figure 4:
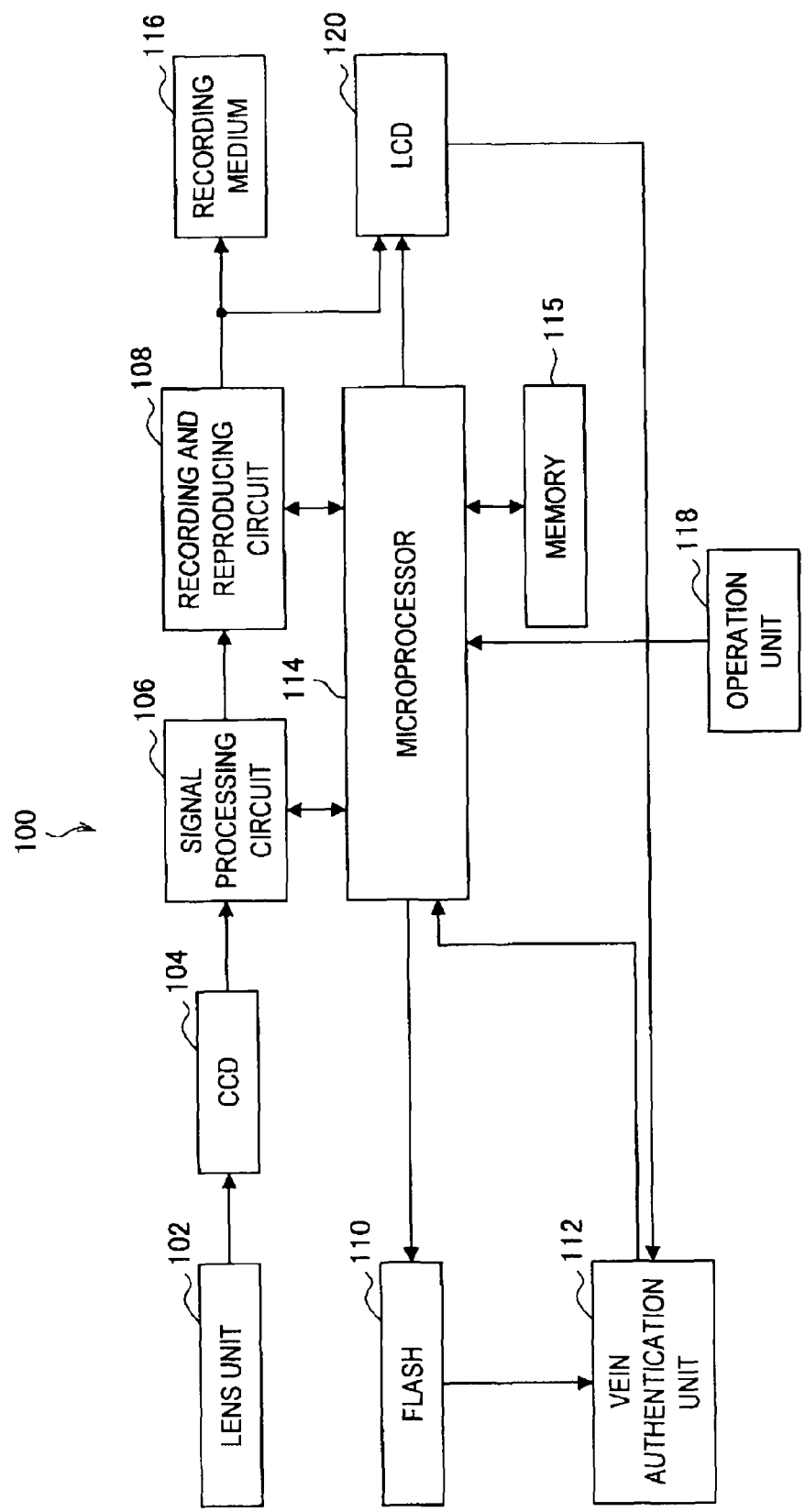
FIG. 4 is an explanatory diagram showing a functional configuration of the image pickup device 100 according to the embodiment of the present invention.

FIG. 4 is an explanatory diagram showing a functional configuration of the image pickup device 100 according to the embodiment of the present invention. The functional configuration of the image pickup device 100 according to the embodiment of the present invention will be described using FIG. 4 in the following.

As shown in FIG. 4, the image pickup device 100 according to the embodiment of the present invention includes the lens unit 102, a CCD image sensor 104, a signal processing circuit 106, a recording and reproducing circuit 108, the flash 110, the vein authentication unit 112, a microprocessor 114, a memory 115, a recording medium 116, the operation unit 118, and the LCD 120.

The lens unit 102 is designed to collect light from a subject and takes the light into the image pickup device 100 when an image is photographed by using the image pickup device 100. The light collected by the lens unit 102 is transmitted to the CCD image sensor 104.

The CCD image sensor 104 converts the light collected by the lens unit 102 into full-color image data (RAW data). The image data generated by the CCD image sensor 104 is transmitted to the signal processing circuit 106. In addition, a CMOS image sensor may be used instead of the CCD image sensor 104 in the present embodiment.

The signal processing circuit 106 performs signal processing on the RAW data created by the CCD image sensor 104 and creates image data. The signal processing performed by the signal processing circuit 106 includes demosaic processing, noise removal processing, compression processing and the like. The image data generated as a result of the signal processing performed in the signal processing circuit 106 is recorded to the recording medium 116 or displayed on the LCD 120 under the control of the recording and reproducing circuit 108.

The recording and reproducing circuit 108 controls the recording of the image data in the recording medium 116, the reading of the image data from the recording medium 116, and the display of the image data on the LCD 120.

The flash 110 is designed to emit light when the image is photographed by using the image pickup device 100, and to irradiate the light to the subject. And in the present image pickup device 100 according to the embodiment of the present invention, the light emitted by the flash 110 is used not only at the time of the image photographing, but also at the time of the biometric authentication using the vein authentication. The image pickup device 100 according to the embodiment of the present invention includes the structure in which the flash 100 pops out from the top of the housing as shown in FIG. 1 and FIG. 2 when photographing by using the flash 110. On the other hand, the image pickup device 100 according to the embodiment of the present invention includes the structure capable of containing the flash 110 within the housing when photographing without using the flash 110.

The vein authentication unit 112 performs the vein authentication processing using a finger of a human hand. The vein authentication unit 112 has a configuration as described above, which includes the light source 112*a* to which the light emitted by the flash 110 is directed and the TFT optical sensor 112*b* which is irradiated with the light from the light source 112*a*.

The microprocessor 114 controls each unit of the image pickup device 100. The memory 115 stores therein information used for the operation of the image pickup device 100. Information on the various settings for photographing, the time and the like may be stored in the memory 115. Moreover, information on the finger vein pattern of the person who has an authority to use the image pickup device 100 may be held in the memory 115. Accordingly, it is preferable to use as the memory 115 a non-volatile memory which does not lose information even when the image pickup device 100 is switched off.

The recording medium 116 stores therein the image photographed by the image pickup device 100. The storage to the recording medium 116 is performed by the control of the recording and reproducing circuit 108. Moreover, the image stored in the recording medium 116 may be displayed on the LCD 120 by the control of the recording and reproducing circuit 108.

The operation unit 118 receives operation on the image pickup device 100. In the image pickup device 100 according to the present embodiment, the operation unit 118 includes the shutter button 118*a* and the operation button 118*b* as shown in FIG. 1 and FIG. 2.

The LCD 120 displays the image photographed by the image pickup device 100 and displays the various settings of the image pickup device 100. The display of the image and the like on the LCD 120 is performed by the control of the microprocessor 114. The LCD 120 includes a LCD panel and a backlight, and the signal-to-noise ratio of the TFT optical sensor 112*b* can be improved by irradiating the light emitted by the backlight from the back side of the LCD panel.

In addition, the image pickup device 100 according to the present embodiment may include a configuration in which not only the light emitted by the flash 110 but also the light of the backlight of the LCD 120 is irradiated to the vein authentication unit 112. The signal-to-noise ratio of the TFT optical sensor 112*b* can be improved by irradiating the light of the backlight of the LCD 120 to the vein authentication unit 112. The configuration for irradiating the light of the backlight of the LCD 120 to the vein authentication unit 112 will be described in detail later.

Moreover, although not shown in FIG. 4, the image pickup device 100 includes a battery for supplying power to each of the units inside. The functional configuration of the image pickup device 100 according to the embodiment of the present invention has been described above. Next, a light collecting mechanism of the flash 110 of the image pickup device 100 according to the embodiment of the present invention will be described.

[1-3. Light Collecting Mechanism of Flash]

Figure 5:
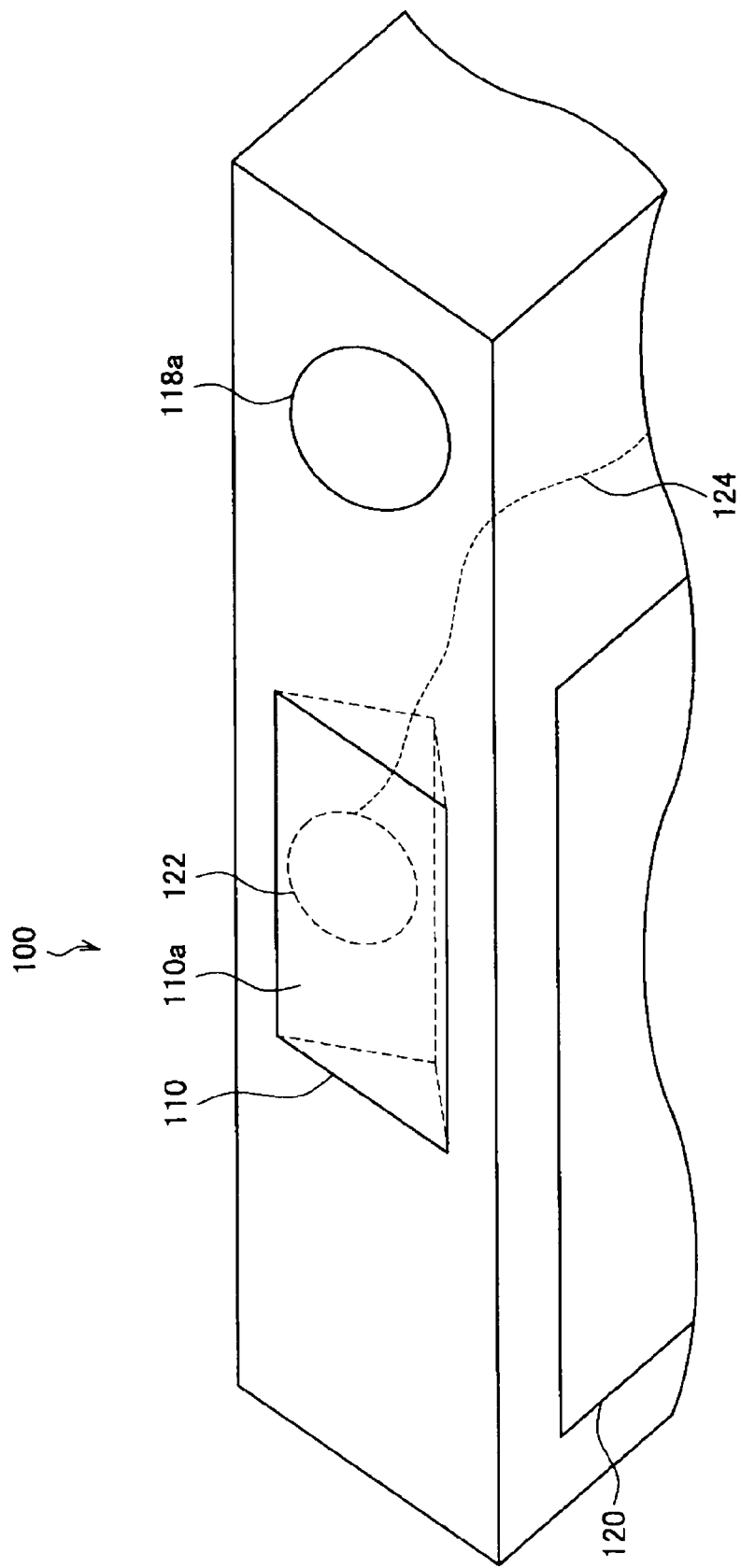
FIG. 5 is an explanatory diagram showing a light collecting mechanism of a flash 110 of the image pickup device 100 according to the embodiment of the present invention.
Figure 6:
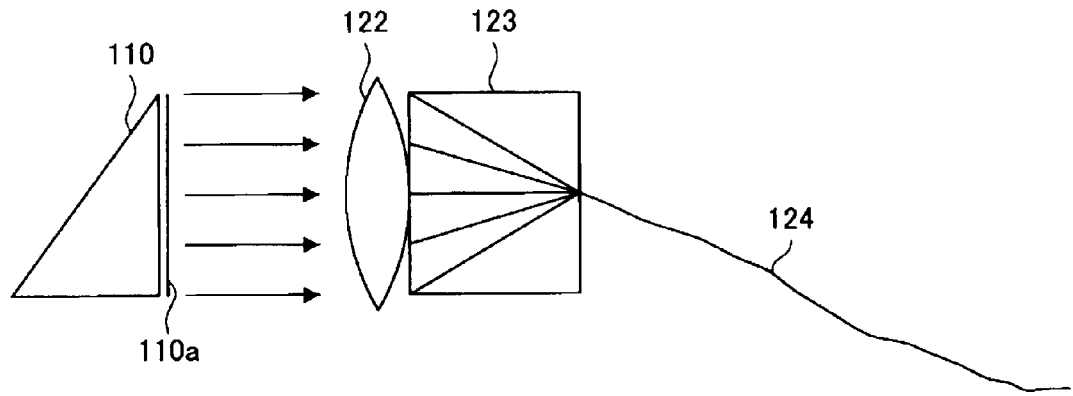
FIG. 6 is an explanatory diagram showing the light collecting mechanism of the flash 110 of the image pickup device 100 according to the embodiment of the present invention.

FIG. 5 and FIG. 6 are explanatory diagram is an explanatory diagram showing the light collecting mechanism of the flash 110 of the image pickup device 100 according to the embodiment of the present invention. In the following, the light collecting mechanism of the flash 110 of the image pickup device 100 according to the embodiment of the present invention will be described using FIG. 5 and FIG. 6.

As described above, the image pickup device 100 according to the embodiment of the present invention includes the structure in which the flash 100 pops out from the top of the housing as shown in FIG. 1 and FIG. 2 when photographing by using the flash 110. On the other hand, the image pickup device 100 according to the embodiment of the present invention includes the structure capable of containing the flash 110 within the housing when photographing without using the flash 110.

Then, when performing the vein authentication processing, the image pickup device 100 according to the embodiment of the present invention causes the flash 110 to emit light with the flash 110 contained within the housing, and furthermore, collects the light emitted by the flash 110 and guides the light to the vein authentication unit 112. The light emitted by the flash 110 and guided to the vein authentication unit 112 is irradiated to the TFT optical sensor 112*b* from the light source 112*a*. With such structure, the image pickup device 100 according to the present embodiment can improve the accuracy of the authentication at the time of the vein authentication processing by improving the signal-to-noise ratio of the TFT optical sensor which is by no means good.

The image pickup device 100 according to the present embodiment includes a structure in which the light of the flash 110 is collected by a light collecting lens 122 composed of a convex lens and the collected light is guided to the vein authentication unit 112 by an optical fiber cable 124 connected to one end of the light collecting lens 122, as shown in FIG. 6.

When registering the vein pattern of the person who has the qualification for the use of the image pickup device 100 and when performing authentication for verifying the qualification for the use of the image pickup device 100 of a person, the image pickup device 100 causes the flash 110 to emit light, with the flash 110 being contained inside the housing of the image pickup device 100, namely, with a light emitting surface 110*a* of the flash 110 not exposed to the outside. In this case, the image pickup device 100 includes a structure in which the flash 110 emits light to the light collecting lens 122. The light emitted to the light collecting lens 122 by the flash 110 is collected by the light collecting lens 122 and is guided to the vein authentication unit 112 by the optical fiber cable 124. Then, the guided light is irradiated from the light source 112*a* and received by the TFT optical sensor 112*b*. In this manner, the image pickup device 100 can perform the registration processing of the vein pattern and the authentication processing by including the structure in which the light emitted by the flash 110 is received by the TFT optical sensor 112*b*.

In addition, when the light from the flash 110 is collected by the light collecting lens 122 and is guided to the optical fiber cable 124, a glass 123 may be used to focus the light collecting lens 122 on the connection end of the optical fiber cable 124, as shown in FIG. 6.

The light collecting mechanism of the flash 110 in the image pickup device 100 according to the embodiment of the present invention has been described above. Next, a registration processing of a vein pattern using the image pickup device 100 according to the embodiment of the present invention will be described.

[1-4. Registration Processing of Vein Pattern]

Figure 7:
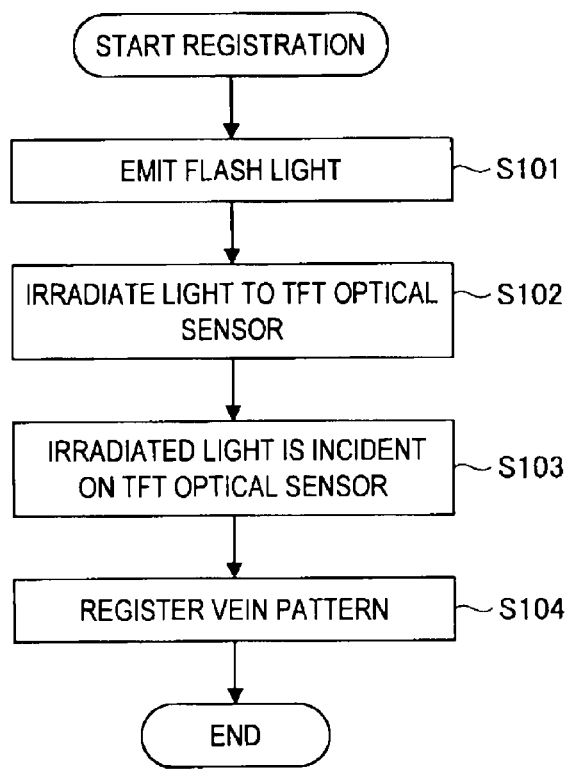
FIG. 7 is a flowchart for explaining registration processing of a vein pattern using the image pickup device 100 according to the embodiment of the present invention.

FIG. 7 is a flowchart for explaining the registration processing of a vein pattern using the image pickup device 100 according to the embodiment of the present invention. In the following, the registration processing of a vein pattern using the image pickup device 100 according to the embodiment of the present invention will be described using FIG. 7.

In order to perform the authentication processing by using the vein authentication with the image pickup device 100 according to the embodiment of the present invention, it is necessary to register in the image pickup device 100 the vein pattern of the person who has the authority to use the image pickup device 100. In order to register the vein pattern of the person who has the authority to use the image pickup device 100 in the image pickup device 100, the person who has the authority inserts his/her index finger in the vein authentication unit 112 and places the index finger on the TFT optical sensor 112*b*. Then, with the index finger placed on the TFT optical sensor 112*b*, the flash 110 is caused to emit light with its light emitting surface 110*a* kept contained within the housing of the image pickup device 100 (step S101). In the present embodiment, the flash 110 may be caused to emit light by pressing the shutter button 118*a*, or when the LCD 120 is equipped with a touch panel, the flash 110 may be caused to emit light by touching the LCD 120 with a finger, for example.

When the flash 110 is caused to emit light, the light emitted by the flash 110 is collected by the light collecting lens 122 and is guided to the vein authentication unit 112 by the optical fiber cable 124. Then, the light guided to the vein authentication unit 112 is irradiated from the light source 112*a* to the TFT optical sensor 112*b* (step S102).

The light irradiated from the light source 112*a* to the TFT optical sensor 112*b* is incident on the TFT optical sensor 112*b* (step S103). As described above, the vein authentication utilizes the near-infrared light absorbing characteristics of hemoglobin in erythrocyte included in the blood flowing through veins in a human finger. When a finger is put on the TFT optical sensor 112*b* and light is irradiated thereon from the above, the light in the near-infrared region passes through the area where there is no vein and is irradiated to the TFT optical sensor 112*b*. On the other hand, the light in the near-infrared region is absorbed by hemoglobin in the area where there are veins. Accordingly, the amount of the light leakage current flowing from the TFT optical sensor 112*b* differs between the area where there are veins and the area where there is no vein. The digitized current value of the light leakage current is registered as a finger vein pattern in the image pickup device 100 (e.g., in the memory 115) (step S104).

In addition, when the registration of the finger vein pattern in the image pickup device 100 is normally completed, the image pickup device 100 may display on the LCD 120 a message to the effect that the registration has been normally completed.

In this manner, by storing the finger vein pattern in the image pickup device 100, the authentication processing by using the vein pattern can be performed in the image pickup device 100.

The registration processing of the vein pattern using the image pickup device 100 according to the embodiment of the present invention has been described above. Next, vein authentication processing using the image pickup device 100 according to the embodiment of the present invention will be described.

[1-5. Vein Authentication Processing]

Figure 8:
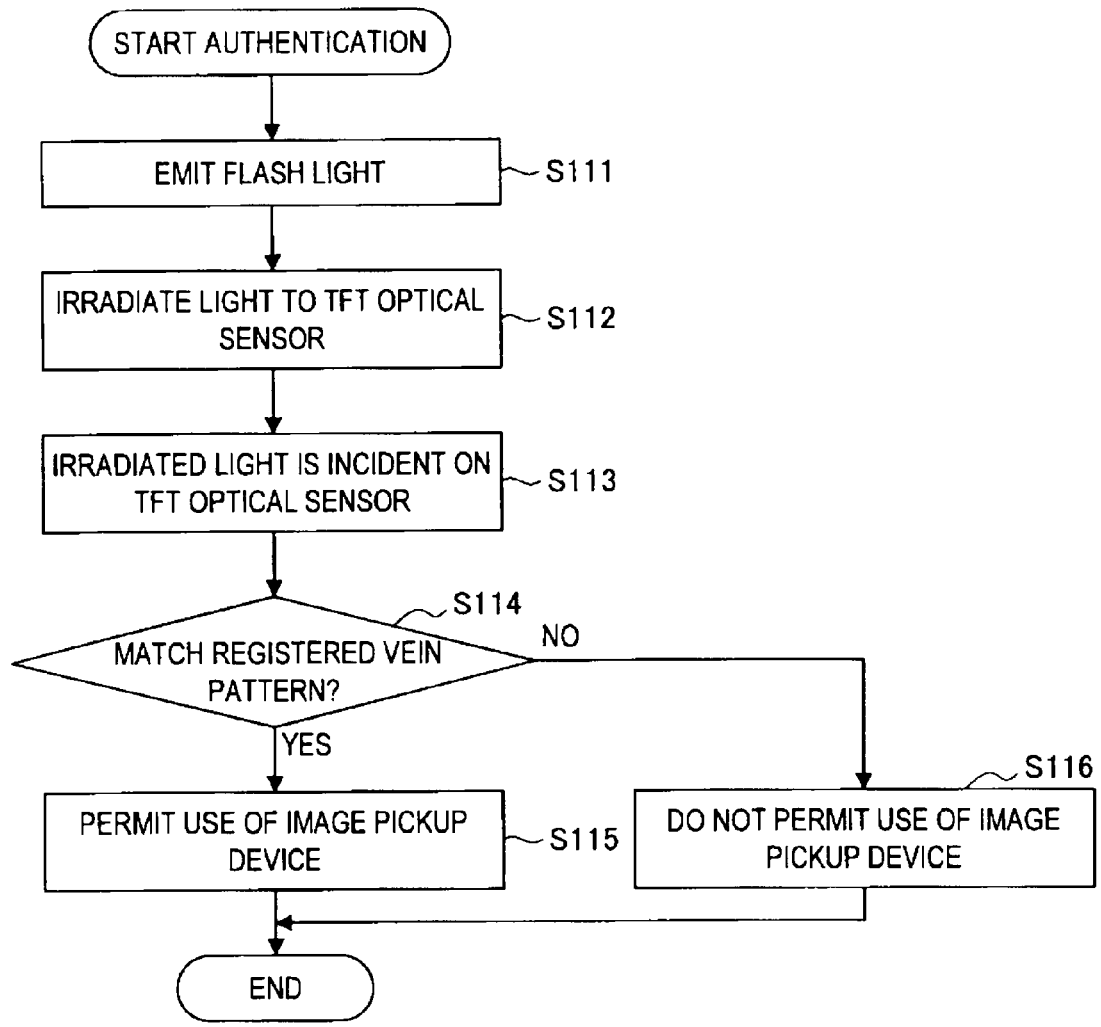
FIG. 8 is a flowchart for explaining vein authentication processing using the image pickup device 100 according to the embodiment of the present invention.

FIG. 8 is a flowchart for explaining the vein authentication processing using the image pickup device 100 according to the embodiment of the present invention. In the following, the vein authentication processing using the image pickup device 100 according to the embodiment of the present invention will be described using FIG. 8.

In order to perform the authentication processing by using the vein authentication with the image pickup device 100 according to the embodiment of the present invention, it is necessary to determine whether the vein pattern of a person who intends to use the image pickup device 100 matches the preliminarily registered vein pattern of the person who has the authority to use the image pickup device 100. In order to determine whether the vein pattern of the person who intends to use the image pickup device 100 matches the vein pattern of the person who has the authority to use the image pickup device 100, a index finger of the person who intends to use the image pickup device 100 is inserted in the vein authentication unit 112, and the index finger is placed on the TFT optical sensor 112*b*. Then, with the index finger placed on the TFT optical sensor 112*b*, the flash 110 is caused to emit light with its light emitting surface 110*a* kept contained within the housing of the image pickup device 100 (step S111). In the present embodiment, the flash 110 may be caused to emit light by pressing the shutter button 118*a*, or when the LCD 120 is equipped with a touch panel, the flash 110 may be caused to emit light by touching the LCD 120 with a finger, for example.

When the flash 110 is caused to emit light, the light emitted by the flash 110 is collected by the light collecting lens 122 and is guided to the vein authentication unit 112 by the optical fiber cable 124. The light guided to the vein authentication unit 112 is irradiated from the light source 112*a* to the TFT optical sensor 112*b* (step S112).

The light irradiated from the light source 112*a* to the TFT optical sensor 112*b* is incident on the TFT optical sensor 112*b* (step S113). As described above, the amount of the light leakage current flowing from the TFT optical sensor 112*b* differs between the area where there are veins and the area where there is no vein. Accordingly, the digitized current value of the light leakage current is assumed to be a finger vein pattern and it is determined by the microprocessor 114 whether the pattern matches the already registered finger vein pattern (step S114).

When the vein pattern of the finger placed on the TFT optical sensor 112*b* matches the registered finger vein pattern as a result of the determination at the step S114 described above, the image pickup device 100 allows the person who requires the authentication to use the image pickup device 100 (step S115). On the other hand, when the vein pattern of the finger placed on the TFT optical sensor 112*b* does not match the registered finger vein pattern as a result of the determination at the step S114 described above, the image pickup device 100 does not allow the person who requires the authentication to use the image pickup device 100 (step S116).

The vein authentication processing using the image pickup device 100 according to the embodiment of the present invention has been described above. In this manner, the authentication processing by using the vein pattern can be performed in the image pickup device 100, by determining whether the vein pattern of the finger inserted in the vein authentication unit 112 matches the finger vein pattern stored in the image pickup device 100. In addition, when the vein authentication processing using the image pickup device 100 is completed, the image pickup device 100 may displays on the LCD 120 a result of the vein authentication processing.

<2. Modification of the Embodiment of the Present Invention>

Figure 9:
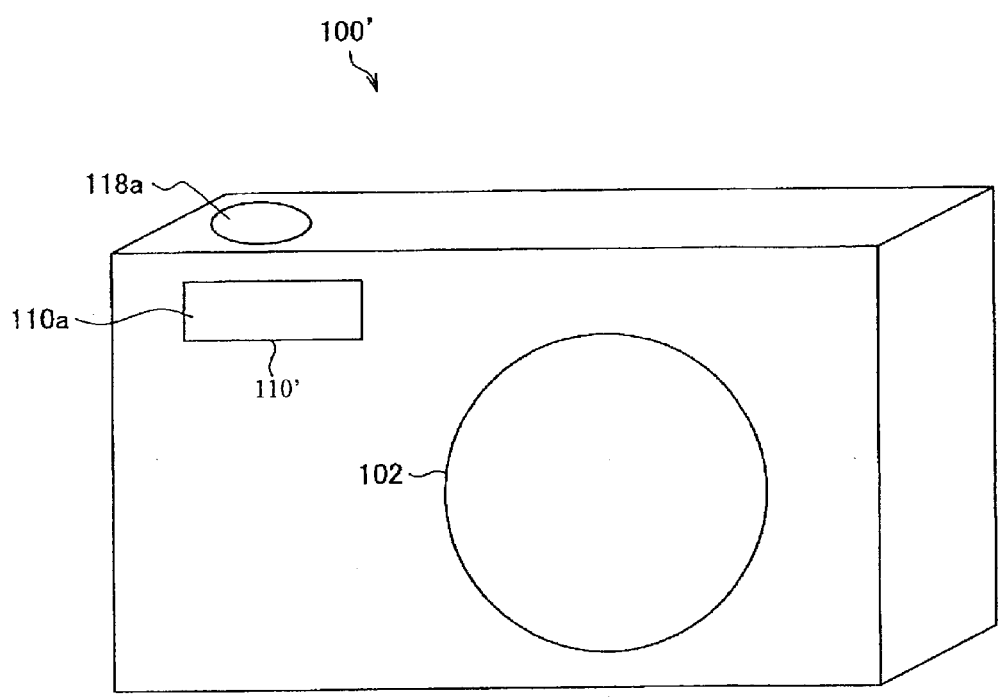
FIG. 9 is an explanatory diagram showing an example of the appearance of an image pickup device 100' according to a first modification of the embodiment of the present invention.

Subsequently, a modification of the embodiment of the present invention will be described. FIG. 9 is an explanatory diagram showing an example of the appearance of an image pickup device 100' according to a first modification of the embodiment of the present invention.

The image pickup device 100 shown in FIG. 1 and FIG. 2 has the structure in which the flash 110 is contained within the housing and pops out from the top of the housing at the time of photographing by using the flash 110. On the contrary, the image pickup device 100' shown in FIG. 9 includes a structure in which the flash 110' is contained within the housing.

The image pickup device 100' shown in FIG. 9 includes a structure in which light emitted by the flash 110' is guided to the vein authentication unit 112 at the time of vein authentication, and light emitted by the flash 110' is shielded so that the light does not to reach the vein authentication unit 112 when the vein authentication is not performed.

Figure 10:
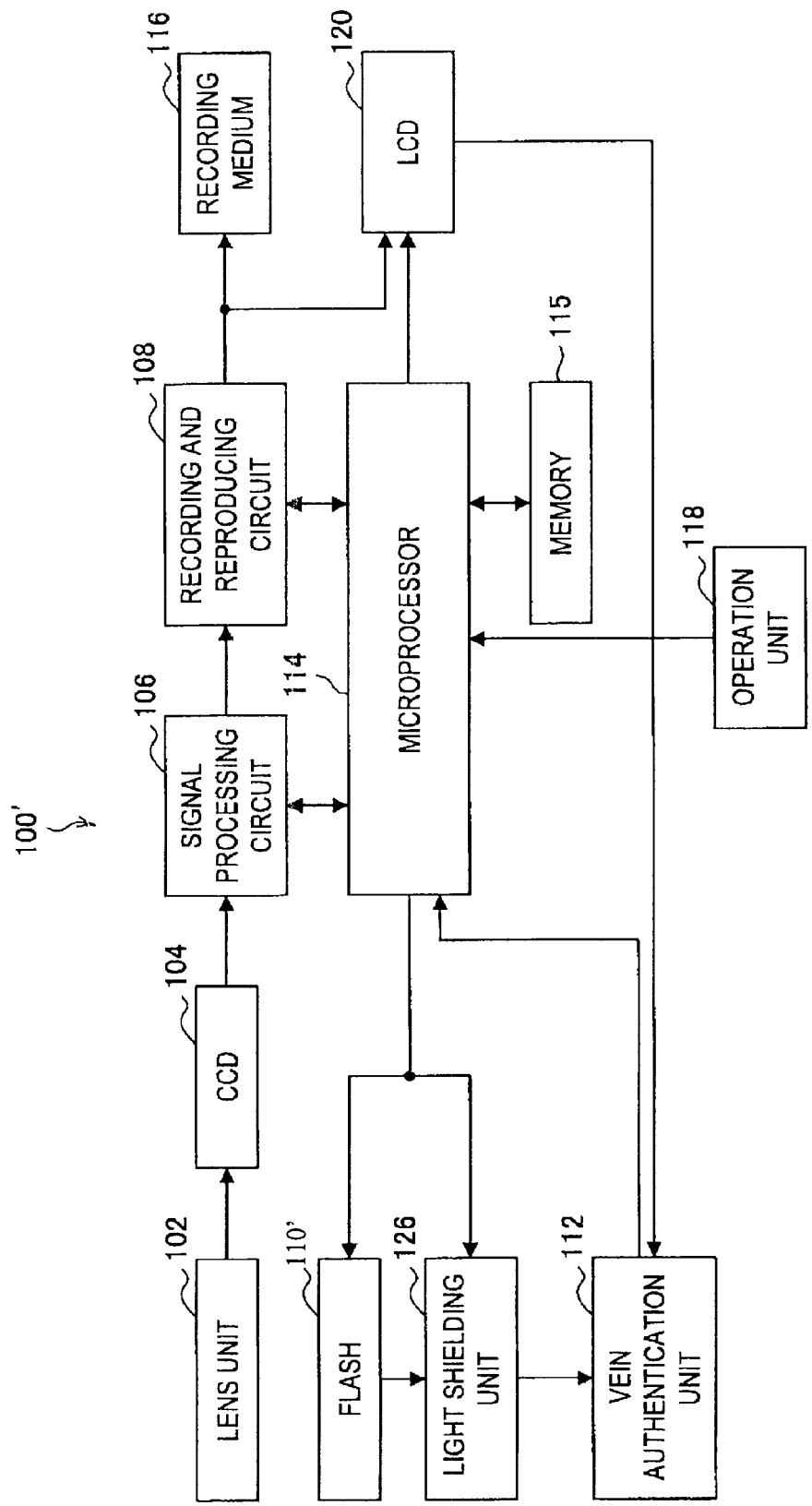
FIG. 10 is an explanatory diagram showing a functional configuration of the image pickup device 100' according to the first modification of the embodiment of the present invention.

FIG. 10 is an explanatory diagram showing a functional configuration of the image pickup device 100' according to the first modification of the embodiment of the present invention. The functional configuration of the image pickup device 100' shown in FIG. 10 differs from that of the image pickup device 100 shown in FIG. 4 in that a light shielding unit 126 is included between the flash 110' and the vein authentication unit 112. The light shielding unit 126 allows the light emitted by the flash 110' to pass directly to the vein authentication unit 112, by the control of the microprocessor 114, when the vein authentication processing using the image pickup device 100' is performed. On the other hand, the light shielding unit 126 shields the light emitted by the flash 110' and functions such that the light emitted by the flash 110' does not reach the vein authentication unit 112, by the control of the microprocessor 114, when the photographing using the flash 110' is performed. The light shielding unit 126 may be a thin plate-like member, for example, and may shield the light emitted by the flash 110' and may let the light pass, by the member being rotated or slid.

By configuring the image pickup device 100' in this manner, the light from the flash 110' can be irradiated to the vein authentication unit 112 when the vein authentication processing using the image pickup device 100' is performed. The signal-to-noise ratio of the TFT optical sensor 112b can be improved by irradiating the light from the flash 110' to the vein authentication unit 112, thereby enabling the accuracy of the authentication to be improved.

Figure 11:
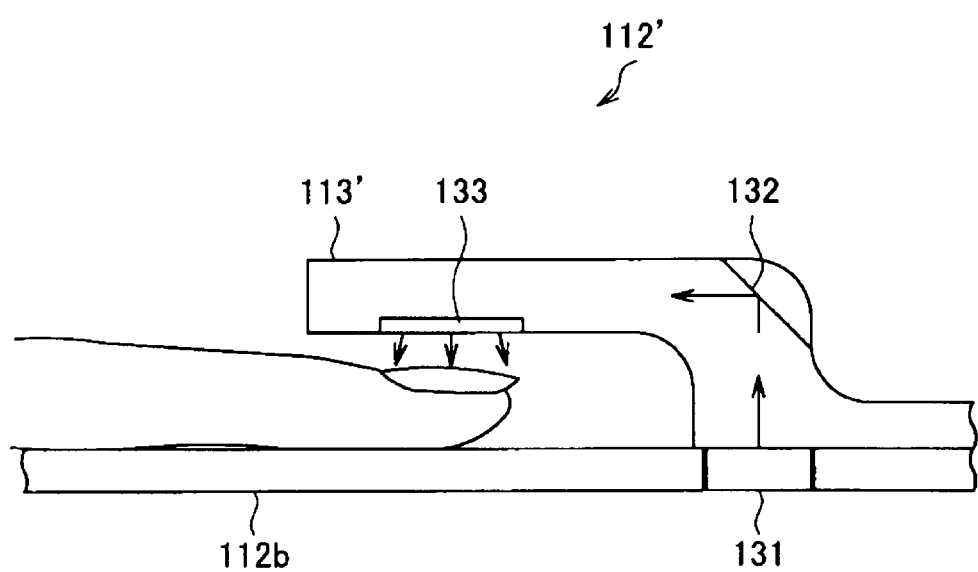
FIG. 11 is an explanatory diagram showing a cross section seen from the side of a vein authentication unit 112' according to a second modification of the embodiment of the present invention.

FIG. 11 is an explanatory diagram showing a cross section seen from the side of a vein authentication unit 112' according to a second modification of the embodiment of the present invention. The vein authentication unit 112' shown in FIG. 11 includes a structure in which light of a backlight of the LCD is irradiated to the TFT optical sensor 112b. As shown in FIG. 11, the vein authentication unit 112' according to the second modification of the embodiment of the present invention includes a cover 113', a LCD backlight 131, a mirror 132, and a light source 133.

The cover 113' is an example of the external-light shielding unit of the present invention, which plays a role of preventing the external light such as sunlight or light of a fluorescent from being irradiated to the TFT optical sensor 112b at the time of the vein authentication processing. The LCD backlight 131 irradiates light from the back side of the panel in order to display an image on the LCD 120. A LED (Light Emitting Device) may be used for the LCD backlight 131, for example. In the present modification, the signal-to-noise ratio of the TFT optical sensor 112b can be improved by using a part of the light emitted by the LCD backlight 131 for the vein authentication processing in the vein authentication unit 112'.

The mirror 132 reflects light from the LCD backlight 131. Since the light from the LCD backlight 131, as it is, is difficult to be irradiated to the TFT optical sensor 112b, the light from the LCD backlight 131 is reflected by the mirror 132 in the present modification.

The light source 133 irradiates light to the TFT optical sensor 112b, and the light irradiated from the LCD backlight 131 and reflected by the mirror 132 is emitted from the LCD backlight 131 in the present modification.

By configuring vein authentication unit 112' in this manner, the light irradiated from the LCD backlight 131 can be irradiated to the TFT optical sensor 112b. By having the configuration in which the light irradiated from the LCD backlight 131 is irradiated to the TFT optical sensor 112b, the vein authentication unit 112' according to the present modification can improve the signal-to-noise ratio of the TFT optical sensor 112b at the time of the vein authentication processing.

The modifications of the embodiment of the present invention have been described above. Here, an arrangement of the TFTs used as the TFT optical sensor 112b will be described.

<3. Arrangement of TFTs>

In the past, when vein authentication processing is attempted in an image pickup device, there was an issue that the size of the housing increased by containing therein the TFT optical sensor 112b. In order to solve such issue, in the present embodiment, the TFTs used as the TFT optical sensor are formed on the same substrate as the TFTs used as switching devices for displaying an image on the LCD. By forming the TFTs used as the TFT optical sensor in this manner, the increase in the size of the housing can be suppressed, and at the same time, the manufacturing process can be simplified.

Figure 12:
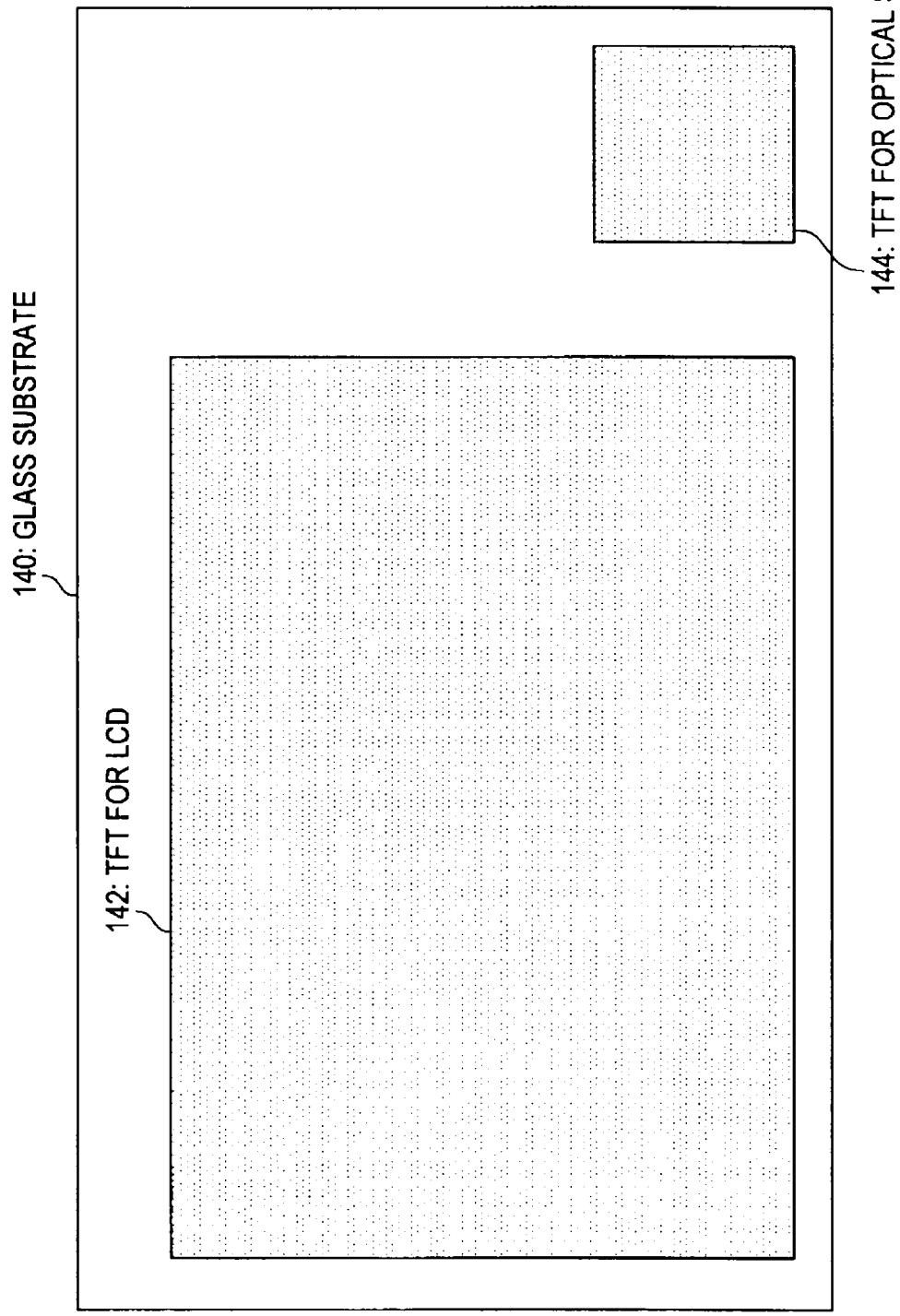
FIG. 12 is an explanatory diagram showing an example of a glass substrate on which TFTs are formed.

FIG. 12 is an explanatory diagram showing an example of a glass substrate on which TFTs are formed in the image pickup device 100' according to the embodiment of the present invention. FIG. 12 shows a glass substrate 140 on which TFTs 142 for the LCD and TFTs 144 for the optical sensor are formed. By forming the TFTs 142 for the LCD and the TFTs 144 for the optical sensor on the same glass substrate in this manner, the increase in the size of the housing can be suppressed, and at the same time, the manufacturing process can be simplified.

FIG. 13 is an explanatory diagram showing a functional configuration of an image pickup device 100" according to the embodiment of the present invention. FIG. 13 shows the functional configuration of the image pickup device 100" in the case where the TFTs 142 for the LCD and the TFTs 144 for the optical sensor are formed on the glass substrate 140. Accordingly, FIG. 13 illustrates the LCD 120 and the vein authentication unit 112 as included in the glass substrate 140. In the image pickup device 100" shown in FIG. 13, the vein authentication unit 112 may be irradiated with light from the backlight of the LCD 120 or may be irradiated with light from the flash 110.

Figure 14A:
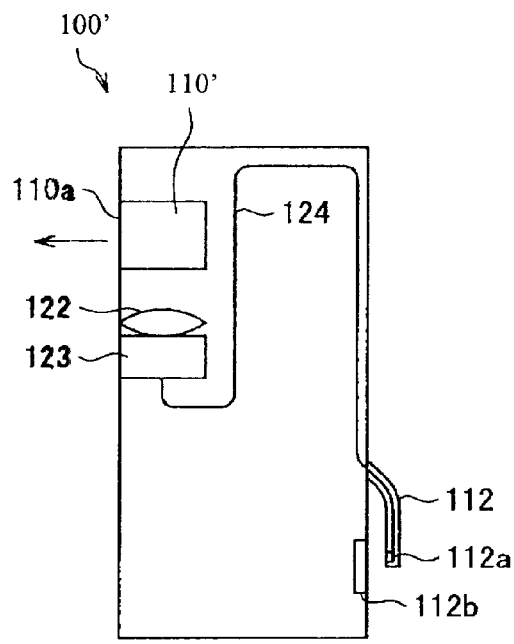
FIG. 14A is an explanatory diagram showing a third modification of the embodiment of the present invention.
Figure 14B:
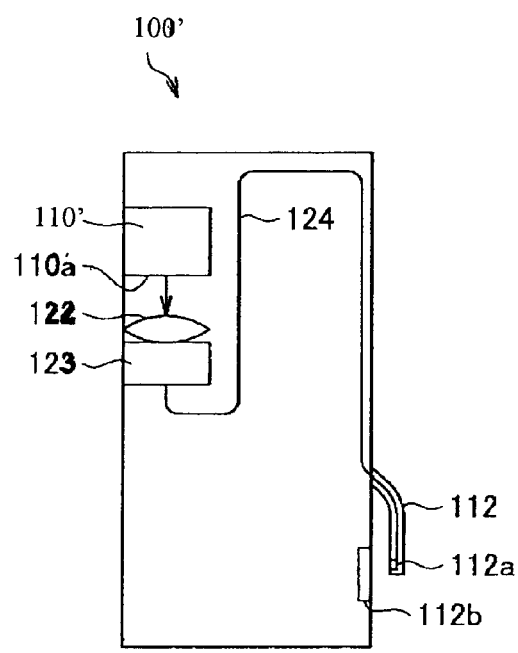
FIG. 14B is an explanatory diagram showing the third modification of the embodiment of the present invention.

FIG. 14A and FIG. 14B are explanatory diagrams showing a third modification of the embodiment of the present invention. FIG. 14A and FIG. 14B show side cross sections of the image pickup device 100' according to the first modification of the embodiment of the present invention described above. In the present modification, when photographing by using the flash 110', the light emitting surface 110a of the flash 110' faces the front of the image pickup device 100'. On the other hand, when utilizing the light emitted by the flash 110' for the vein authentication processing, the light emitting surface 110a of the flash 110' faces the inside of the image pickup device 100'. When the vein authentication processing using the image pickup device 100' is performed, the flash 110' is rotated and the light emitting surface 110a faces the light collecting lens 122 provided within the image pickup device 100'. Then, the flash 110' emits light toward the light collecting lens 122 provided within the image pickup device 100'. The light emitted toward the light collecting lens 122 is transmitted to the optical fiber cable 124 through the light collecting lens 122 and the glass 123 and irradiated to the vein authentication unit 112 from the optical fiber cable 124.

Figure 15A:
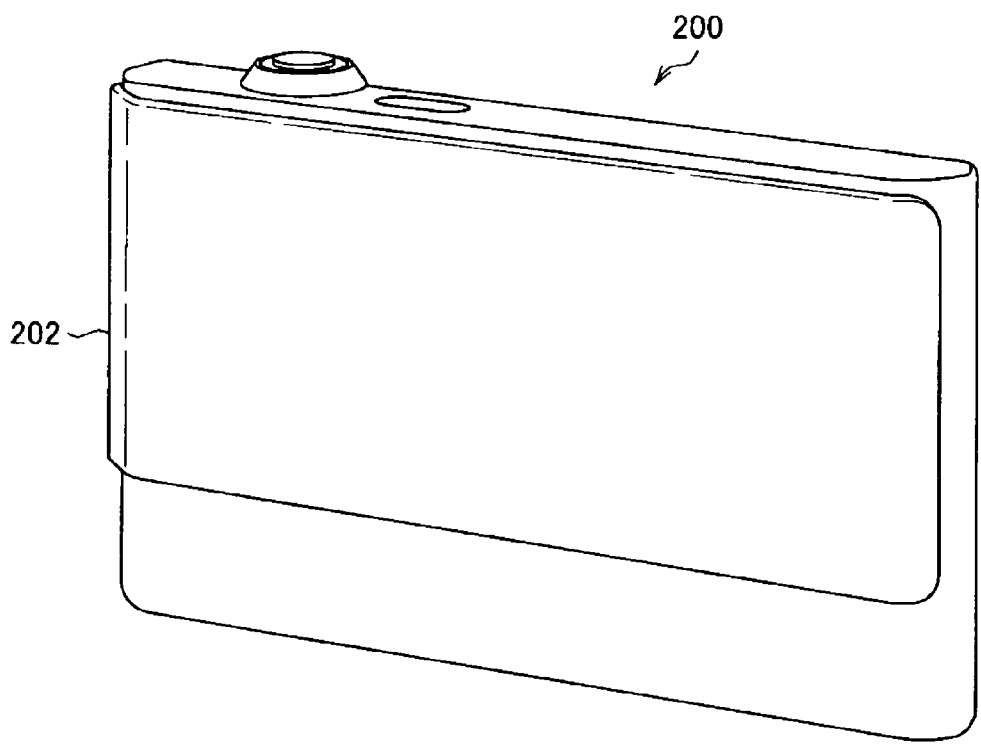
FIG. 15A is an explanatory diagram showing the appearance of an image pickup device 200 according to a fourth modification of the embodiment of the present invention.
Figure 15B:
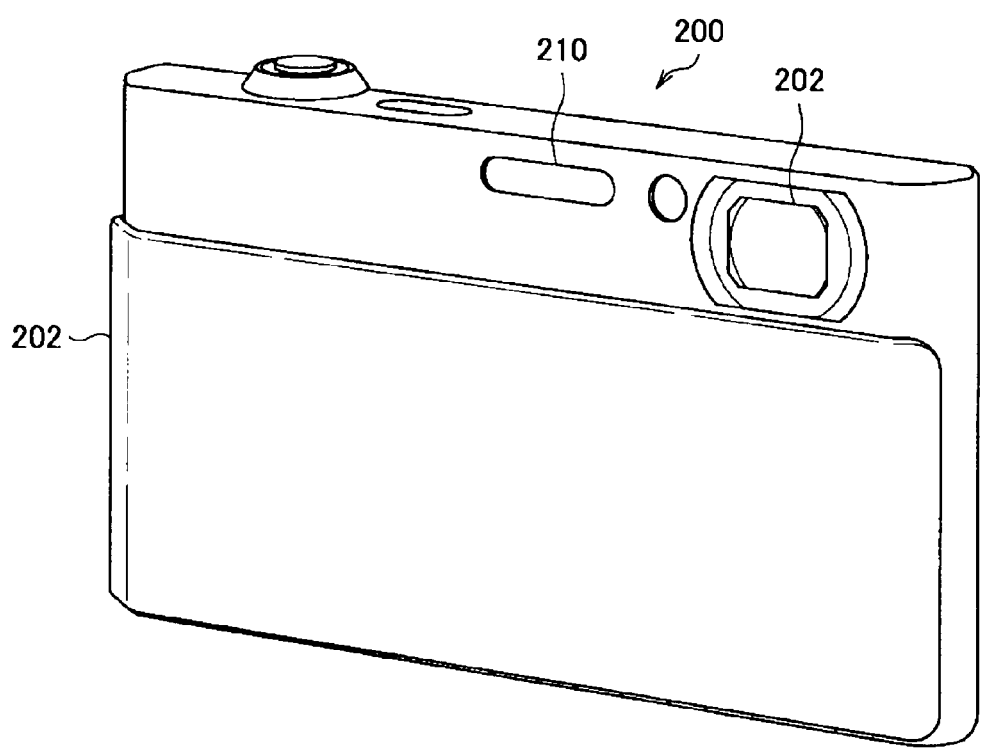
FIG. 15B is an explanatory diagram showing the appearance of the image pickup device 200 according to the fourth modification of the embodiment of the present invention.

FIG. 15A and FIG. 15B are explanatory diagrams showing the appearance of an image pickup device 200 according to a fourth modification of the embodiment of the present invention. The image pickup device 200 includes a configuration in which a lens unit 202 and a flash 210 can be covered by a lens cover 201. FIG. 15A shows the appearance of the image pickup device 200 with the lens unit 202 and the flash 210 covered by the lens cover 201. FIG. 15B shows the appearance of the image pickup device 200 with the lens cover 201 lowered and the lens unit 202 and the flash 210 exposed for photographing a subject. In addition, although a shape of the backside of the image pickup device 200 is not particularly illustrated, the image pickup device 200 includes on the backside thereof the vein authentication unit for performing the vein authentication processing, in the same manner as the shape of the backside of the image pickup device 100 shown in FIG. 2.

When the vein authentication processing with the image pickup device 200 including such configuration is performed, the flash 210 is caused to emit light with the lens unit 202 and the flash 210 covered by the lens cover 201 as shown in FIG. 15A. The light of the flash 210 may be guided to the vein authentication unit by the configuration like that shown in FIG. 14A and FIG. 14B, or may be guided to the vein authentication unit after the light being reflected by the lens cover 201 and the reflected light being collected, for example.

In addition, although the image pickup device has been shown as an example of the electronic device of the present invention in the above description, it goes without saying that the present invention can be applied to electronic devices other than image pickup devices, and the present invention can be applied to electronic devices including a light emitting means used for other purpose than irradiating light to the TFT optical sensor.

<Summary>

As described above, according to the image pickup device 100 according to the embodiment of the present invention, the vein authentication unit 112 for performing the vein authentication processing can be added to the device without increasing the size of the device. The TFT optical sensor 112b included in the vein authentication unit 112 can be irradiated with the light emitted by the flash 110 and with the light emitted by the backlight of the LCD 120. By configuring the vein authentication unit 112 in this manner, the signal-to-noise ratio of the TFT optical sensor 112b can be improved, and thereby the accuracy of the vein authentication processing in the vein authentication unit 112 can be improved.

Moreover, in the image pickup device 100 according to the embodiment of the present invention, the TFTs used for the TFT optical sensor 112b are formed on the same substrate with the TFTs used as the switching devices for displaying an image on the LCD 120. By forming the TFTs in this manner, a vein authentication function can be added to the image pickup device 100 without increasing the size of the device.

Although a preferred embodiment of the present invention is described in the foregoing with reference to the drawings, the present invention is not limited thereto. It should be understood by those skilled in the art that various modifications, combinations, sub-combinations and alterations may occur depending on design requirements and other factors insofar as they are within the scope of the appended claims or the equivalents thereof.

The present invention can be applied to an electronic device, particularly to an electronic device for performing biometric authentication processing by using vein authentication.

The present application contains subject matter related to that disclosed in Japanese Priority Patent Application JP 2009-098413 filed in the Japan Patent Office on Apr. 14, 2009, the entire content of which is hereby incorporated by reference.

What is claimed is:

1. An electronic device comprising:
    a flash that emits light to a subject when the subject is imaged;
    a vein authentication unit including a light detection unit that is irradiated with the light emitted by the flash and that includes an optical sensor that outputs an electric current corresponding to the brightness of the light emitted from the flash;
    a light collecting lens that collects the light emitted from the flash; and
    an optical fiber cable connected to the light collecting lens that guides the light emitted from the flash to the optical sensor.

2. The electronic device according to claim 1, wherein when the light emitted from the flash is irradiated to the light detection unit, a light emitting surface of the flash faces an inside of a housing without being exposed to an outside of the housing.

3. The electronic device according to claim 1, wherein the vein authentication unit includes an external-light shielding unit that blocks irradiation of external light, other than the light emitted from the flash, to the light detection unit.

4. The electronic device according to claim 1, wherein the optical sensor includes a light absorbing film that transmits only light in a near-infrared region among the light emitted by the flash.

5. The electronic device according to claim 1, wherein the optical sensor is a Thin Film Transistor (TFT) that is irradiated by the light emitted from the flash and outputs the electric current corresponding to the brightness of the light emitted from the flash.

6. The electronic device according to claim 1, wherein the electronic device includes a housing having a structure in which the flash movably pops out from the housing and is contained within the housing.

7. The electronic device according to claim 6, wherein the vein authentication unit includes a cover disposed at a position opposing the optical sensor.

8. The electronic device according to claim 5, wherein the vein authentication unit includes an opening between the cover and the optical sensor in which a user's finger is placed to perform vein authentication.

9. The electronic device according to claim 7, wherein the light collecting lens collects the light emitted from the flash when the flash is contained within the housing.

* * * * *